US012672614B2

(12) United States Patent
Zhou et al.

(10) Patent No.: US 12,672,614 B2
(45) Date of Patent: Jul. 7, 2026

(54) INTEGRATED REGULATION AND CONTROL DEVICE AND METHOD FOR LIGHT, HEAT AND WATER IN GREENHOUSE, AND GREENHOUSE

(71) Applicant: Institute of Urban Agriculture, Chinese Academy of Agricultural Sciences, Chengdu (CN)

(72) Inventors: Wanlai Zhou, Chengdu (CN); Qichang Yang, Chengdu (CN); Zhiyong Qi, Chengdu (CN)

(73) Assignee: Institute of Urban Agriculture, Chinese Academy of Agricultural Sciences, Chengdu (CN)

( * ) Notice: Subject to any disclaimer, the term of this patent is extended or adjusted under 35 U.S.C. 154(b) by 592 days.

(21) Appl. No.: 18/127,062

(22) Filed: Mar. 28, 2023

(65) Prior Publication Data

US 2023/0232756 A1 Jul. 27, 2023

(30) Foreign Application Priority Data

Apr. 14, 2022 (CN) .......................... 202210390908.2

(51) Int. Cl.
*A01G 9/24* (2006.01)
*A01G 9/14* (2006.01)

(52) U.S. Cl.
CPC ................. *A01G 9/24* (2013.01); *A01G 9/14* (2013.01)

(58) Field of Classification Search
CPC . A01G 9/24; A01G 9/14; A01G 9/246; A01G 9/247; Y02A 40/25; E03B 3/28

USPC ........................................................ 165/48.1
See application file for complete search history.

(56) References Cited

U.S. PATENT DOCUMENTS

| | | | | |
|---|---|---|---|---|
| 5,813,168 | A * | 9/1998 | Clendening ............ | A01G 9/246 47/17 |
| 6,732,951 | B1 * | 5/2004 | Salazar ................. | F24F 5/0035 285/5 |
| 10,443,900 | B2 * | 10/2019 | Kujak ...................... | F25B 7/00 |
| 10,986,789 | B1 * | 4/2021 | Roberts ................... | A01G 9/26 |
| 12,044,416 | B2 * | 7/2024 | Plinke ................... | F24D 11/007 |

(Continued)

FOREIGN PATENT DOCUMENTS

| | | | |
|---|---|---|---|
| CN | 203788819 U | * | 8/2014 |
| CN | 109804827 A | * | 5/2019 |

(Continued)

*Primary Examiner* — Jenna M Maroney
*Assistant Examiner* — Gustavo A Hincapie Serna
(74) *Attorney, Agent, or Firm* — Hemisphere Law, PLLC

(57) ABSTRACT

The present disclosure discloses an integrated regulation and control device and method for light, heat and water in a greenhouse, and a greenhouse. The regulation and control device includes a shading and condensing plate arranged at a top of a chamber of a greenhouse; a cavity is formed in the shading and condensing plate; the shading and condensing plate is further provided with a water inlet and a water outlet which are communicated to the cavity; the regulation and control device further includes an energy supply system and a heat dissipation device; the energy supply system can inject a cold source into the cavity through the water inlet; the energy supply system can also transport a heat source to the heat dissipation device; the heat dissipation device can dissipate heat of the heat source into the greenhouse.

8 Claims, 4 Drawing Sheets

(56)     References Cited

U.S. PATENT DOCUMENTS

| | | | |
|---|---|---|---|
| 2015/0150202 A1 | 6/2015 | Hessel et al. | |
| 2015/0173308 A1* | 6/2015 | Lefsrud | A01G 9/14 |
| | | | 47/17 |
| 2016/0370122 A1* | 12/2016 | Fu | F28D 20/0034 |
| 2017/0105363 A1* | 4/2017 | Tomita | A01G 9/243 |
| 2018/0192596 A1 | 7/2018 | Howis et al. | |
| 2020/0348059 A1* | 11/2020 | Begarelli | F25B 1/04 |
| 2020/0355381 A1* | 11/2020 | Lutz | F24D 17/0005 |
| 2021/0195851 A1* | 7/2021 | Okumura | D03D 1/0058 |
| 2021/0352853 A1* | 11/2021 | Day | F24F 3/14 |
| 2022/0007592 A1* | 1/2022 | Bicer | C02F 1/14 |
| 2022/0167566 A1* | 6/2022 | Steentjes | A01G 9/241 |
| 2022/0201943 A1* | 6/2022 | Parrella | A01G 9/241 |
| 2022/0205684 A1 | 6/2022 | Tatsumi et al. | |
| 2022/0217920 A1* | 7/2022 | Venusio Tamburrino | |
| | | | B08B 3/04 |
| 2022/0301943 A1* | 9/2022 | Yun | H10D 62/307 |
| 2022/0361418 A1* | 11/2022 | Stanton | A01G 9/26 |
| 2022/0400625 A1* | 12/2022 | Gordon | A01G 9/247 |
| 2023/0097951 A1* | 3/2023 | Huh | A01G 9/14 |
| | | | 47/17 |
| 2023/0263108 A1* | 8/2023 | van Bergenhenegouwen | |
| | | | A01G 9/246 |
| | | | 47/17 |
| 2023/0389485 A1* | 12/2023 | Dulberg | F24F 3/1405 |
| 2023/0408125 A1* | 12/2023 | Cai | F24F 11/63 |
| 2024/0130300 A1* | 4/2024 | Van Bruggen | G05B 15/02 |
| 2024/0237590 A1* | 7/2024 | Daoust | F21V 29/59 |
| 2024/0263851 A1* | 8/2024 | Süß | F25B 49/02 |
| 2025/0093830 A1* | 3/2025 | Rieswijk | A01G 9/24 |
| 2025/0204335 A1* | 6/2025 | Kickert | A01G 9/246 |

FOREIGN PATENT DOCUMENTS

| | | | | |
|---|---|---|---|---|
| CN | 111011057 A | * | 4/2020 | C10L 3/104 |
| CN | 212212125 U | * | 12/2020 | |
| EP | 2910869 B1 | * | 3/2021 | F25B 13/00 |
| ES | 2966491 T3 | * | 4/2024 | A01G 9/246 |
| NL | 2021676 B1 | * | 5/2020 | A01G 9/246 |
| WO | WO-2007079774 A1 | * | 7/2007 | A01G 9/1415 |

* cited by examiner

INTEGRATED REGULATION AND CONTROL DEVICE AND METHOD FOR LIGHT, HEAT AND WATER IN GREENHOUSE, AND GREENHOUSE

TECHNICAL FIELD

The present disclosure relates to the technical field of greenhouses, and particularly to an integrated regulation and control device and method for light, heat and water in a greenhouse, and a greenhouse.

BACKGROUND

Greenhouse is a key component of facility agriculture in China. A greenhouse can provide growth periods and increase yields in seasons that are not suitable for growth of plants. Greenhouses are mostly used for cultivation or seedling raising of plants such as warm-season vegetables, flowers and trees in low-temperature seasons. The greenhouses have played a huge role in ensuring a balanced annual supply of vegetables, increasing employment and promoting income.

In some districts of China, such as Xinjiang, there is sufficient light in the daytime, which is very suitable for the growth of melon and fruit vegetables. In addition, temperature in a closed greenhouse space rises rapidly, so it is often necessary to take a cooling measure. However, the temperature at night decreases sharply, so additional heating is often required. In addition, crops in a greenhouse demand for a large amount of water. For example, daily water consumption of a single tomato plant in a picking period reaches about 1.5 L, and daily water consumption per square meter of a greenhouse space exceeds 5 L. Most water enters air through transpiration and bottom evaporation of plants, resulting in a sharp increase in humidity in the greenhouse. In order to reduce the temperature and humidity in the greenhouse during a high-temperature period in the daytime, a method of combining external shading and forced ventilation or natural ventilation is currently used to exchange air inside and outside the greenhouse, so as to discharge excess water vapor and heat in the greenhouse, thus causing a waste of water resources. During a low-temperature period at night, it is necessary to take a heating measure to prevent the temperature in the greenhouse from being too low.

If greenhouses are used for agricultural planting in these districts, solar energy entering the greenhouses is effectively regulated and utilized, and water in a greenhouse space is collected for recycling, so that light resources in these districts can be fully utilized to produce high-quality agricultural products.

SUMMARY

A first objective of the present disclosure is to overcome the shortcomings in the existing technology, and provide an integrated regulation and control device for light, heat and water in a greenhouse.

The first objective of the present disclosure is achieved through the following technical solutions:

An integrated regulation and control device for light, heat and water in a greenhouse includes a shading and condensing plate arranged below a greenhouse roof; a cavity is formed in the shading and condensing plate; the shading and condensing plate is further provided with a water inlet and a water outlet which are communicated to the cavity; the regulation and control device further comprises an energy supply system and a heat dissipation device; the energy supply system can inject a cold source into the cavity through the water inlet; when a surface temperature of the shading and condensing plate is less than a dew-point temperature of air in the greenhouse, water in the air is coagulated on a surface of the shading and condensing plate; the cold source in the cavity returns to the energy supply system through the water outlet after being heated by the sunlight, to store heat to the energy supply system; the energy supply system can also transport part of the heat to the heat dissipation device; and the heat dissipation device can dissipate the heat into the greenhouse.

By means of the above technical solution, when the temperature in the greenhouse is extremely high in the daytime, the energy supply system can be controlled to inject the cold source into the cavity through the water inlet. The cold source makes the shading and condensing plate have a low temperature, so that the whole greenhouse can be cooled. The cold source also has a certain shading effect, which can avoid such a phenomenon of a sharp rise in the temperature of the greenhouse due to the fact that the sunlight directly irradiates the greenhouse. In addition, the shading and condensing plate has the low temperature under the action of the cold source at this time, the temperature of the air in the greenhouse is inevitably less than that of the shading and condensing plate. It can be understood that when the high-temperature and high-humidity air in the greenhouse contacts the shading and condensing plate, the air will reach a dew-point temperature, and water is then coagulated on the surface of the shading and condensing plate. The water is recycled to achieve recycling of water in a greenhouse space.

Compared with the existing technology, the regulation and control device effectively combines two concepts where the greenhouse is cooled by using the cold source and the water in the air is coagulated by using the cold source, so that integrated regulation and control of light, heat and water in the greenhouse are achieved.

Preferably, the shading and condensing plate is slantways arranged at a top of a chamber of the greenhouse; a water collection tank is arranged at a bottom of the shading and condensing plate; and the water collection tank is used for catching water that is coagulated on a bottom surface of the shading and condensing plate.

By means of the above technical solution, the water coagulated on the bottom surface of the shading and condensing plate will flow to one side of the water collection tank along an inclination angle of the shading and condensing plate, and the water collection tank catches and stores the water. In this way, working personnel can conveniently fetch water from the water collection tank conveniently and reuse it for irrigation. In addition, the coagulated water at this time can flow, so that the bottom surface of the shading and condensing plate can be quickly restored to a state for coagulating water. In other words, the shading and condensing plate has a higher coagulating rate for water in air, and a recycling effect on the water in the greenhouse is better.

Preferably, several hydrophilic bulges are arranged on the bottom surface of the shading and condensing plate.

By means of the above technical solution, the hydrophilic bulges are hydrophilic, that is, the water in the air is more easily coagulated on surfaces of the hydrophilic bulges, thereby increasing the coagulating rate of the shading and condensing plate for the water in the air.

Preferably, the several hydrophilic bulges are arrayed on the bottom surface of the shading and condensing plate, and a diversion trench located between every two adjacent rows of hydrophilic bulges is formed in the bottom surface of the shading and condensing plate; the diversion trench is communicated to each hydrophilic bulge in two adjacent rows through a connecting slot; the connecting slots tilt towards one side of the water collection tank; and the diversion trenches are communicated to the water collection tank.

By means of the above technical solution, the water coagulated on the hydrophilic bulges will be gathered in the diversion trenches under the guide of the connecting slots, and the diversion trenches will divert the water into the water collection tank for storage, so that it is convenient for working personnel to fetch and use water. In addition, based on the above setting, the hydrophilic bulges are more easily restored to the state for coagulating water, and the rate of the shading and condensing plate for coagulating water in air is further increased.

Preferably, the cavity is provided with a cooling end and a heat conduction end which are opposite to each other; the cooling end is located below the heat conduction end; a distance between a top surface of the cavity and a bottom surface of the cavity gradually decreases from the cooling end to the heat conduction end; the water inlet is communicated with the cooling end; and the water outlet is communicated with the heat conduction end.

By means of the above technical solution, the cold source has different thicknesses after being injected into the cavity. Specifically, the thickness of the cold source on one side of the cooling end will be greater than that of the cold source on one side of the heat conduction end. It can be understood that the temperature of one side of the shading and condensing plate close to the cooling end will be less than the temperature of one side close to the heat conduction end, so that the water in the air is more easily coagulated on the side of the shading and condensing plate close to the cooling end. In this way, the coagulating rate of the shading and condensing plate for water is increased to a certain extent. Meanwhile, since the cold source located on one side of the heat conduction end has a smaller thickness, in this way, the sunlight heats this part of cold source more easily, and the heated cold source will directly return to the energy supply system through the water outlet for storage, to provide a heat source to the heat dissipation device when the temperature of the greenhouse decreases. Obviously, based on the special structure of the cavity, the shading and condensing plate can meet requirements for efficiently coagulating the water in the air and quickly heating the cold source in the cavity, so that an integrated control effect on light, heat and water is enhanced.

Preferably, the energy supply system includes a heat pump system; the heat pump system includes a cold end, a hot end and a heat pump body; the cold end includes an evaporator and a cold water tank; the evaporator can cool water in the cold water tank; the water inlet and the water outlet are both communicated to the cold water tank through pipes, so that a circulation cold source flow path is formed between the cavity and the cold water tank; the hot end includes a condenser and a hot water tank; the condenser can heat water in the hot water tank; the hot water tank and the heat dissipation device are communicated through a pipe to form a circulation heat source flow path; and the heat pump body can transport heat stored in the cold end to the hot end.

By means of the above technical solution, the evaporator makes the water in the cold water tank have a low temperature, and the cold water is injected into the cavity to realize the function of the shading and condensing plate. The cold water heated by the sunlight will flow into the cold water tank through the water outlet, and the heat absorbed by the cold water from the sunlight can be transported through the heat pump body into the hot water tank for storage. Furthermore, when the temperature of the greenhouse is relatively low, this part of heat will be dissipated into the greenhouse via the heat source flow path, thereby realizing a temperature increasing function of the regulation and control device for the greenhouse.

Preferably, the heat dissipation device includes a heat dissipation pipe arranged in the greenhouse, and the heat dissipation pipe is communicated to the hot water tank.

By means of the above technical solution, when the temperature in the greenhouse decreases, the energy supply system can transport the heat source into the heat dissipation pipe, and the heat of the heat source will be dissipated into the greenhouse through the heat dissipation pipe, thereby increasing the temperature of the air in the greenhouse.

Preferably, a cold-water color adjustment device is also communicated between the water inlet and the cold water tank; and the cold-water color adjustment device can inject pigments with different colors into cold water flowing by.

By means of the above technical solution, the cold-water color adjustment device can change the color of the cold water. The colored cold water is injected into the cavity, which can change the entire light environment of the greenhouse. The cold water with different colors are selected, which can meet growth requirements of different plants, thereby increasing a yield of plants in the greenhouse.

In conclusion, the regulation and control device of the present disclosure includes at least one of the following beneficial technical effects:

1. The shading and condensing plate is arranged below a greenhouse roof, and the cold source is injected into the cavity through the energy supply system, to realize shading and cooling functions for the greenhouse. Meanwhile, the water in the greenhouse will be coagulated on the surface of the shading and condensing plate. This part of water can be recycled. The cold source, heated by the sunlight, in the cavity can return to the energy supply system through the cold source flow path for heat storage, so as to increase the temperature in the greenhouse by the heat dissipation device. In addition, the cold-water color adjustment device is arranged in the cold source flow path, to change a light transmittance and a heat absorption rate of the cold source, and provide for the plants in the greenhouse a light environment that is more suitable for meeting a demand of the plants for light. According to the above, it is reflected that the regulation and control device has multiple functions of light regulation, water collection and heat storage.

2. The cavity is provided with the cooling end and the heat conduction end which are opposite to each other, so that after flowing into the cavity, the cold source can simultaneously achieve high efficiency of the shading and condensing plate for condensing water and high efficiency of the cold source for absorbing solar heat.

A second objective of the present disclosure is to provide an integrated regulation and control method for light, heat and water in a greenhouse.

The second objective of the present disclosure is achieved through the following technical solutions:

The integrated regulation and control method for light, heat and water in the greenhouse involves the above integrated regulation and control device for light, heat and water in a greenhouse, and further includes the following steps:

S1, when the greenhouse is exposed to too strong sunlight in the daytime, controlling the energy supply system to inject a cold source into the cavity of the shading and condensing plate, to reduce a light intensity of light entering the greenhouse, wherein during the period, the cold source, heated by the sunlight, in the cavity returns to the energy supply system for heat storage, and at the same time, since air in the greenhouse contacts the shading and condensing plate with a relatively low temperature, water is coagulated on a surface of the shading and condensing plate, and the water is collected and reused for irrigation; and S2, when a temperature in the greenhouse is relatively low, controlling the energy supply system to transport the stored heat to the heat dissipation device, wherein the heat dissipation device dissipates the heat into the greenhouse, to increase the temperature of the greenhouse.

By means of the above technical solution, the regulation and control device is switched among different use states according to different temperature states in the greenhouse, thus achieving integrated regulation and control of light, heat and water in the greenhouse. The greenhouse regulated and controlled by the present disclosure can regulate and control the temperature in the greenhouse, and recycle the water in the greenhouse, so that the greenhouse has higher use reliability.

A third objective of the present disclosure is to provide a greenhouse.

The third objective of the present disclosure is achieved through the following technical solutions:

A greenhouse includes the above integrated regulation and control device for light, heat and water in a greenhouse.

By means of the above technical solution, the greenhouse can achieve integrated regulation and control of light, heat and water by using the regulation and control device, and water in the greenhouse can be recycled while a temperature in the greenhouse is regulated and controlled, so that the greenhouse has relatively high use reliability.

Figure 1:
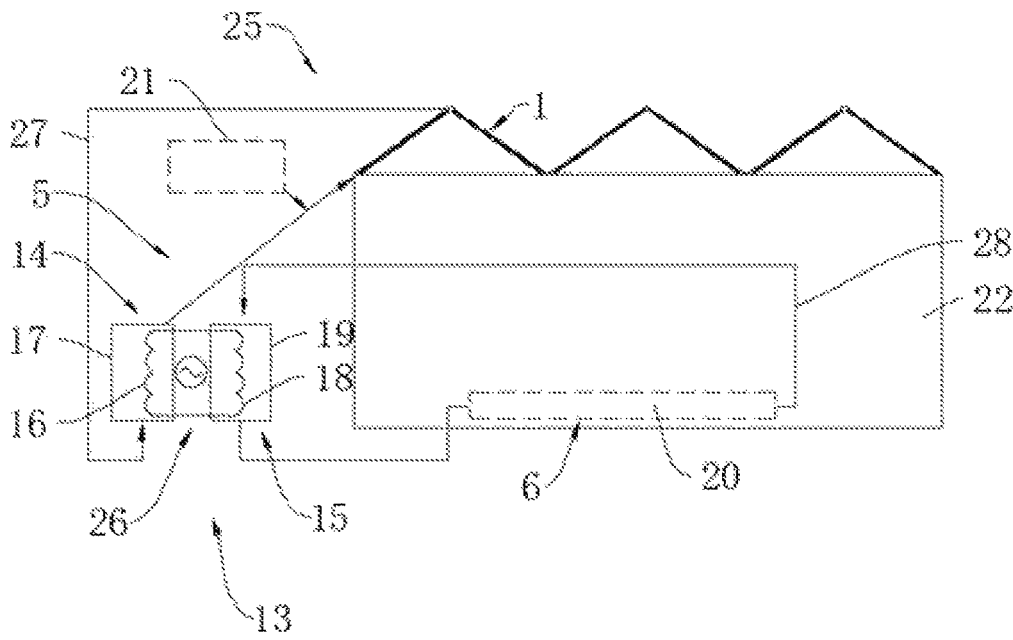
FIG. 1 is a schematic connection diagram of an energy supply system, a shading and condensing plate and a heat dissipation device according to Embodiment I.
Figure 2:
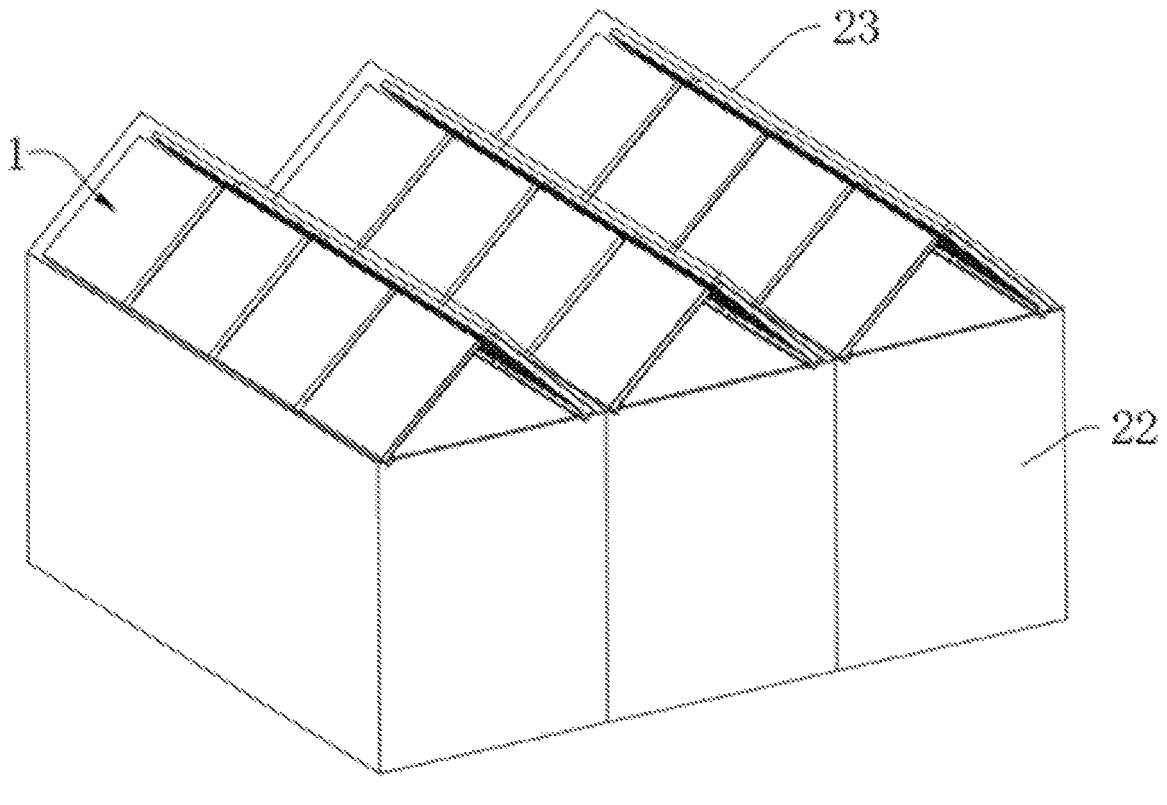
FIG. 2 is a schematic diagram of distribution of a shading and condensing plate and a greenhouse according to Embodiment I.
Figure 3:
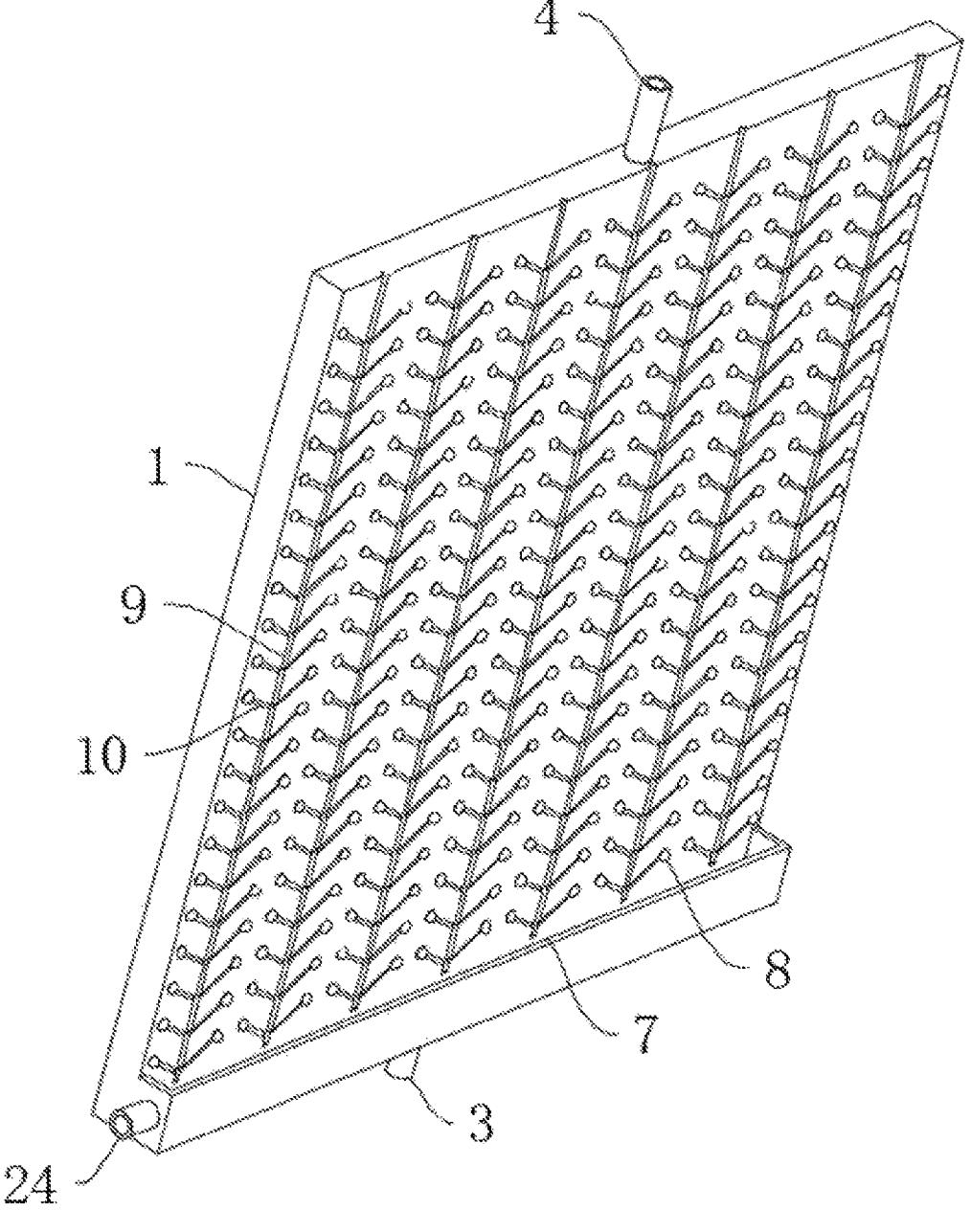
FIG. 3 is a schematic structural diagram of a shading and condensing plate according to Embodiment I.
Figure 4:
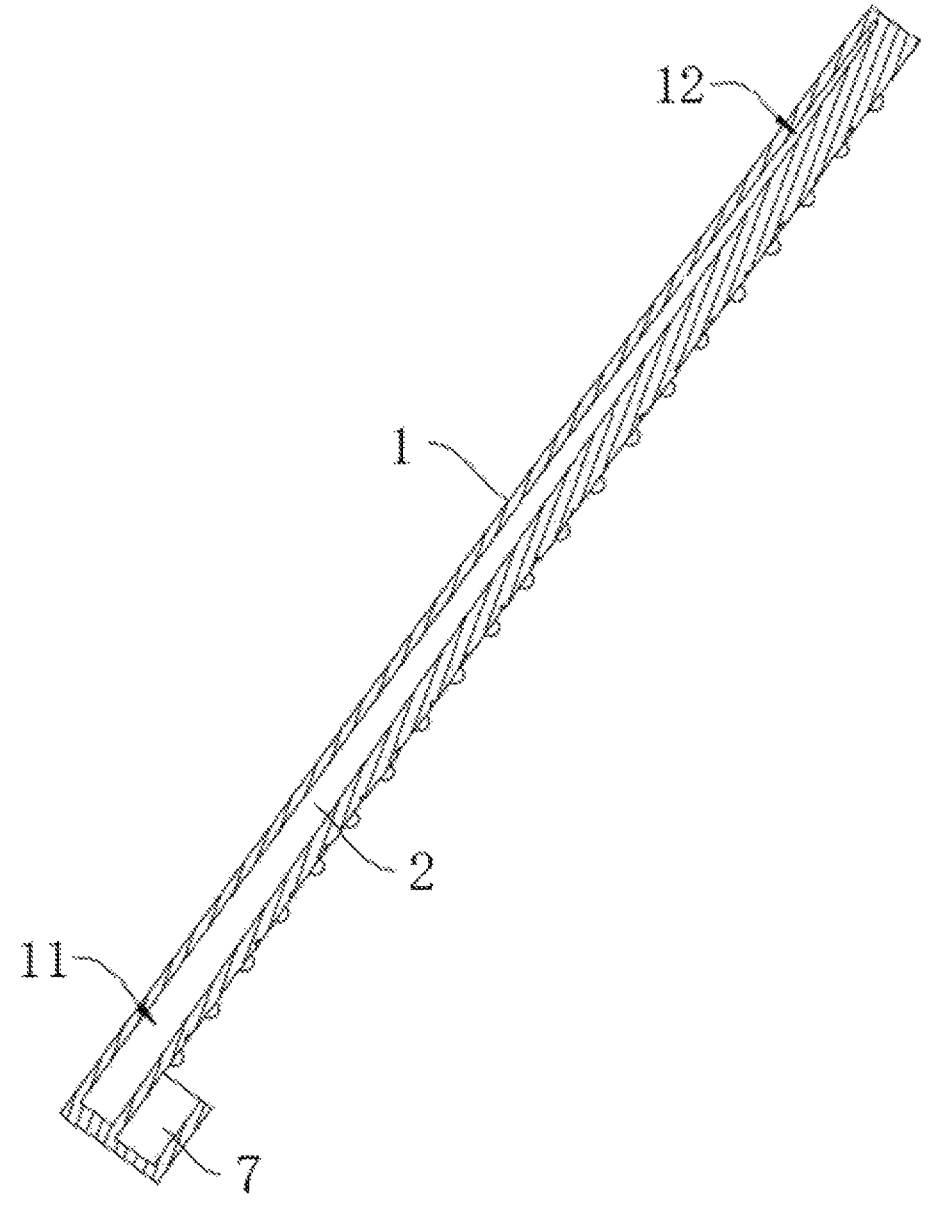
FIG. 4 is a schematic sectional structural diagram of a shading and condensing plate according to Embodiment I.

Numerals in the drawings: 1: shading and condensing plate; 2: cavity; 3: water inlet; 4: water outlet; 5: energy supply system; 6: heat dissipation device; 7: water collection tank; 8: hydrophilic bulge; 9: diversion trench; 10: connecting slot; 11: cooling end; 12: heat conduction end; 13: heat pump system; 14: cold end; 15: hot end; 16: evaporator; 17: cold water tank; 18: condenser; 19: hot water tank; 20: heat dissipation pipe; 21: cold-water color adjustment device; 22: greenhouse; 23: roof; 24: water collection pipe; 25: regulation and control device; 26: heat pump body; 27: cold source flow path; and 28: heat source flow path.

DETAILED DESCRIPTION OF THE EMBODIMENTS

Technical solutions of the present disclosure will be described clearly and completely below in combination with the embodiments. Obviously, the embodiments described herein are only part of the embodiments of the present disclosure, not all the embodiments. Based on the embodiments in the present disclosure, all other embodiments obtained by those skilled in the art without creative work shall fall within the scope of protection of the present disclosure.

Embodiment I

As shown in FIG. 1: An integrated regulation and control device 25 for light, heat and water in a greenhouse includes a shading and condensing plate 1 arranged at a top of a chamber of a greenhouse 22.

As shown in FIG. 1 to FIG. 4, specifically, the shading and condensing plate 1 is slantways arranged at the top of the chamber of the greenhouse 22. For example, the top of the greenhouse 22 can be formed into an inclined roof 23. The shading and condensing plate 1 is arranged below the roof 23. The shading and condensing plate 1 is made of a high-transmittance material, and a cavity 2 is formed inside the shading and condensing plate. The shading and condensing plate 1 is further provided with a water inlet 3 and a water outlet 4 which are communicated to the cavity 2. In order to balance a temperature in the greenhouse 22, the regulation and control device 25 further includes an energy supply system 5 and a heat dissipation device 6. The energy supply system 5 can inject a cold source into the cavity 2, so that the temperature in the greenhouse 22 decreases. The energy supply system 5 can also transport a heat source to the heat dissipation device 6. The heat dissipation device 6 can dissipate heat of the heat source into the greenhouse 22, so that the temperature in the greenhouse 22 increases.

When the sunlight in the daytime is strong, and the greenhouse 22 needs to be cooled, the energy supply system 5 can be controlled to inject the cold source into the cavity 2, and the shading and condensing plate 1 filled with the cold source can isolate the sunlight to a certain extent, to reduce the light intensity of the sunlight irradiating plants in the greenhouse, so that the greenhouse 22 is kept in an appropriate light environment, and the temperature in the greenhouse decreases. It is worth noting that the shading and condensing plate 1 has a relatively low temperature under the action of the cold source. In this way, when high-temperature and high-humidity air in the greenhouse 22 contacts the shading and condensing plate 1, water in the air will be coagulated on a surface of the shading and condensing plate 1, and recycling the water can achieve cyclic utilization of the water in the greenhouse 22. The cold source heated by the sunlight will return to the energy supply system 5 through the water outlet 4 for heat storage. When the greenhouse 22 needs to be subjected to thermal insulation, the energy supply system 5 can transport this part of heat to the heat dissipation device 6, to meet a requirement for increasing the temperature in the greenhouse 22.

In order to enhance a condensing effect of the shading and condensing plate 1 on the water in the air, several hydrophilic bulges 8 are arranged on a bottom surface of the shading and condensing plate 1. The hydrophilic bulges 8 are hydrophilic, so that the water can be more efficiently coagulated on surfaces of the hydrophilic bulges 8. In order to facilitate collection of the coagulated water, a water collection tank 7 is arranged at a bottom of the shading and condensing plate 1, so that the coagulated water will flow into the water collection tank 7 for storage under the action of gravity, and working personnel can fetch the water more conveniently. In detail, the several hydrophilic bulges 8 are arrayed on the bottom surface of the shading and condensing plate 1. A diversion trench 9 communicated to the water collection tank 7 and located between every two adjacent rows of hydrophilic bulges (8) is formed in the bottom surface of the shading and condensing plate 1. The diversion trench (9) is communicated to each hydrophilic bulge 8 in two adjacent rows through a connecting slot 10. The diversion trenches 9 are internally coated with hydrophobic coatings. It can be imagined that when the water is coagulated on the hydrophilic bulges 8, the water will flow into the diversion trenches 9 through the connecting slots 10, and the diversion trenches 9 may guide the water to the water collection tank 7 for storage. At this time, the hydrophilic bulges 8 are more easily restored to a use state for coagulating the water, thus improving the coagulating efficiency of the shading and condensing plate 1 for the water.

In addition, in order to take into account the efficiency of the shading and condensing plate 1 for condensing water and the efficiency of the cold source for absorbing solar heat, the cavity 2 is provided with a cooling end 11 and a heat conduction end 12 which are opposite to each other. A wall thickness of the cavity 2 gradually decreases from the cooling end 11 to one side of the heat conduction end 12 (that is, a distance between a top surface of the cavity 2 and a bottom surface of the cavity 2 gradually decreases from the cooling end 11 to one side of the heat conduction end 12). More specifically, the cooling end 11 is located at the bottom of the shading and condensing plate 1, and the heat conduction end 12 is located at the top of the shading and condensing plate 1. The water inlet 3 is communicated with the cooling end 11, and the water outlet 4 is communicated with the heat conduction end 12. It can be understood that when the energy supply system 5 injects the cold source into the cavity 2 through the water inlet 3, the cold source will have different thickness in the cavity 2, that is, the thickness of the cold source on one side of the cooling end 11 will be greater than the thickness of the cold source on one side of the heat conduction end 12, thus making the shading and condensing plate 1 have a lower temperature on one side of the cooling end 11, so that it is more likely to coagulate the water in the air to a surface of the cooling end. At the same time, the sunlight can heat the cold source located on one side of the heat conduction end 12 more quickly. The heated cold source can directly return to the energy supply system 5 through the water outlet 4 for heat storage. Obviously, based on the above solution, the shading and condensing plate 1 can not only efficiently coagulate the water in the air, but also enable the sunlight to effectively heat the cold source in the cavity 2, so that the integrated regulation and control effect of the regulation and control device 25 on light, heat and water is better.

The energy supply system 5 includes a heat pump system 13. The heat pump system 13 includes a cold end 14, a hot end 15 and a heat pump body 26. The cold end 14 includes an evaporator 16 and a cold water tank 17. The cold water tank 17 covers the evaporator 16. Based on use characteristics of the evaporator 16, the evaporator 16 can cool water in the cold water tank 17 during operation. The hot end 15 includes a condenser 18 and a hot water tank 19. The hot water tank 19 covers the condenser 18. Based on use characteristics of the condenser 18, the condenser 18 can heat water in the hot water tank 19 during operation. It can be understood that at this time, the cold water in the cold water tank 17 is the cold source required by the shading and condensing plate 1, while the hot water in the hot water tank 19 is the heat source required by the heat dissipation device 6. More specifically, the water inlet 3 and water outlet 4 are both communicated to the cold water tank 17 through pipes, thus forming a circulation cold source flow path 27 between the cavity 2 and the cold water tank 17, and the hot water tank 19 and the heat dissipation device 6 are communicated through a pipe to form a circulation heat source flow path 28. The cold source, heated by the sunlight, in the cavity 2 returns to the cold water tank 17 through the water outlet 4 and the pipe. The heat pump body 26 will transport this part of the heat to the hot water tank 19 for heat storage to meet a requirement of the heat dissipation device 6 for heat.

The heat dissipation device 6 may include a heat dissipation pipe 20 arranged in the greenhouse 22. When the temperature in the greenhouse needs to increase, the hot water in the hot water tank 19 can be pumped into the heat dissipation pipe 20 through a pipe. At this time, the heat of the hot water can enter the greenhouse 22 through the heat dissipation pipe 20, thus realizing a temperature increasing function of the heat dissipation device 6 on the greenhouse 22.

A cold-water color adjustment device 21 is also connected between the water inlet 3 and the cold water tank 17. The cold-water color adjustment device 21 can mix pigments with different colors and inject the pigments into the cold water flowing by, thus changing the color of the cold water. When the colored cold water is injected into the cavity 2, the entire light environment of the greenhouse 22 can be changed, which provides for the plants in the greenhouse 22 a light environment that is more suitable for meeting a demand of the plants for light, thereby increasing a yield of the plants in the greenhouse 22. In addition, a light transmittance and a heat absorption rate of the cold water can also be changed by regulating and controlling concentrations of pigments injected into cold water, so as to further synergistically regulate and control the light and temperature in greenhouse 22.

Moreover, the water collection tank 7 is provided with a water collection pipe 24 communicated to the inside, so that the water stored in the water collection tank 7 can be directly transported to the ground through the water collection pipe 24 for recycling, and the regulation and control device 25 has high convenience in use.

Embodiment II

An integrated regulation and control method for light, heat and water in a greenhouse involves the integrated regulation and control device for light, heat and water in a greenhouse in Embodiment I, and further includes the following steps:

S1, when the greenhouse is exposed to too strong sunlight in the daytime, controlling the energy supply system to inject a cold source into the cavity of the shading and condensing plate, to reduce a light intensity of light entering the greenhouse, wherein during the period, the cold source, heated by the sunlight, in the cavity returns to the energy supply system for heat storage, and at the same time, since air in the greenhouse contacts the shading and condensing plate with a relatively low temperature, water is coagulated on a surface of the shading and condensing plate, and the water is collected and reused for irrigation; and S2, when a temperature in the greenhouse is relatively low, controlling the energy supply system to transport the stored heat to the heat dissipation device, wherein the heat dissipation device dissipates the heat into the greenhouse, to increase the temperature of the greenhouse.

By using the regulation and control method in this embodiment, the regulation and control device can be switched among different use states according to different temperature states in the greenhouse, thus achieving integrated regulation and control of light, heat and water in the greenhouse. Furthermore, the greenhouse regulated and controlled by this embodiment can regulate and control the temperature in the greenhouse, and recycle the water in the greenhouse, so that the greenhouse has higher use reliability.

Embodiment III

A greenhouse includes the integrated regulation and control device for light, heat and water in a greenhouse in Embodiment I.

The greenhouse in this embodiment can achieve integrated regulation and control of light, heat and water by using the regulation and control device, and water in the greenhouse can be recycled while a temperature in the greenhouse is regulated and controlled, so that the greenhouse has relatively high use reliability.

The above descriptions are preferred implementations of the present disclosure. It should be understood that the present disclosure is not limited to the form disclosed herein and should not be regarded as the exclusion of other embodiments, but can be used for various other combinations, modifications, and environments. The present disclosure can be changed within the conceived scope by means of the above teachings or technologies or knowledge in the related art. The modifications and changes made by those skilled in the art do not depart from the spirit and scope of the present disclosure, and shall all fall within the protection scope of the appended claims of the present disclosure.

What is claimed is:

1. An integrated regulation and control device for light, heat and water in a greenhouse, comprising a shading and condensing plate (1) arranged below a greenhouse roof; a cavity (2) is formed in the shading and condensing plate (1); the shading and condensing plate (1) is further provided with a water inlet (3) and a water outlet (4) which are communicated to the cavity (2); the regulation and control device further comprises an energy supply system (5) and a heat dissipation device (6); the energy supply system (5) is able to inject a cold source into the cavity (2) through the water inlet (3); when a surface temperature of the shading and condensing plate (1) is less than a dew-point temperature of air in the greenhouse, water in the air is coagulated on a surface of the shading and condensing plate (1); the cold source in the cavity (2) returns to the energy supply system (5) through the water outlet (4) after being heated by the sunlight, to store heat to the energy supply system (5); the energy supply system (5) is also able to transport part of the heat to the heat dissipation device (6); and the heat dissipation device (6) is able to dissipate the heat into the greenhouse, the shading and condensing plate (1) is slantways arranged at a top of a chamber of the greenhouse; a water collection tank (7) is arranged at a bottom of the shading and condensing plate (1); and the water collection tank (7) is used for catching water that is coagulated on a bottom surface of the shading and condensing plate (1).

2. The integrated regulation and control device for light, heat and water in the greenhouse according to claim 1, wherein several hydrophilic bulges (8) are arranged on the bottom surface of the shading and condensing plate (1).

3. The integrated regulation and control device for light, heat and water in the greenhouse according to claim 2, wherein the several hydrophilic bulges (8) are arrayed on the bottom surface of the shading and condensing plate (1), and a diversion trench (9) located between every two adjacent rows of hydrophilic bulges (8) is formed in the bottom surface of the shading and condensing plate (1); the diversion trench (9) is communicated to each hydrophilic bulge (8) in two adjacent rows through a connecting slot (10); the connecting slots (10) tilt towards one side of the water collection tank (7); and the diversion trenches (9) are communicated to the water collection tank (7).

4. The integrated regulation and control device for light, heat and water in the greenhouse according to claim 1, wherein the cavity (2) is provided with a cooling end (11) and a heat conduction end (12) which are opposite to each other; the cooling end (11) is located below the heat conduction end (12); a distance between a top surface of the cavity (2) and a bottom surface of the cavity (2) gradually decreases from the cooling end (11) to the heat conduction end (12); the water inlet (3) is communicated with the cooling end (11); and the water outlet (4) is communicated with the heat conduction end (12).

5. The integrated regulation and control device for light, heat and water in the greenhouse according to claim 1, wherein the energy supply system (5) comprises a heat pump system (13); the heat pump system (13) comprises a cold end (14), a hot end (15) and a heat pump body (26); the cold end (14) comprises an evaporator (16) and a cold water tank (17); the evaporator (16) is able to cool water in the cold water tank (17); the water inlet (3) and the water outlet (4) are both communicated to the cold water tank (17) through pipes, so that a circulation cold source flow path (27) is formed between the cavity (2) and the cold water tank (17); the hot end (15) comprises a condenser (18) and a hot water tank (19); the condenser (18) is able to heat water in the hot water tank (19); the hot water tank (19) and the heat dissipation device (6) are communicated through a pipe to form a circulation heat source flow path (28); and the heat pump body (26) is able to transport heat stored in the cold end (14) to the hot end (15).

6. The integrated regulation and control device for light, heat and water in the greenhouse according to claim 5, wherein the heat dissipation device (6) comprises a heat dissipation pipe (20) arranged in the greenhouse, and the heat dissipation pipe (20) is communicated to the hot water tank (19).

7. The integrated regulation and control device for light, heat and water in the greenhouse according to claim 5, wherein a cold-water color adjustment device (21) is also communicated between the water inlet (3) and the cold water tank (17); and the cold-water color adjustment device (21) is able to inject pigments with different colors into cold water flowing by.

8. A greenhouse, comprising: the integrated regulation and control device for light, heat and water in a greenhouse according to claim 1.

* * * * *